US009776498B2

(12) United States Patent
Kaltenbach et al.

(10) Patent No.: US 9,776,498 B2
(45) Date of Patent: Oct. 3, 2017

(54) DEVICE INCLUDING A GEAR UNIT AND AN ELECTRIC MACHINE FOR A HYBRID DRIVE AND HYBRID DRIVE

(71) Applicant: ZF Friedrichshafen AG, Friedrichshafen (DE)

(72) Inventors: Johannes Kaltenbach, Friedrichshafen (DE); Timo Wehlen, Friedrichshafen (DE); Michael Roske, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 456 days.

(21) Appl. No.: 14/309,191

(22) Filed: Jun. 19, 2014

(65) Prior Publication Data

US 2014/0373675 A1    Dec. 25, 2014

(30) Foreign Application Priority Data

Jun. 20, 2013   (DE) .................. 10 2013 211 591

(51) Int. Cl.
*B60K 6/38*      (2007.10)
*B60K 6/387*    (2007.10)
(Continued)

(52) U.S. Cl.
CPC .............. *B60K 6/547* (2013.01); *B60K 6/38* (2013.01); *B60K 6/387* (2013.01); *B60K 6/48* (2013.01);
(Continued)

(58) Field of Classification Search
CPC ....................................................... B60K 6/38
See application file for complete search history.

(56) References Cited

U.S. PATENT DOCUMENTS 8,480,535 B2 *   7/2013   Tanba .................. B60K 6/38
                                                    180/338
8,505,659 B2 *   8/2013   Favaretto ............. B60K 6/36
                                                    180/305
(Continued)

FOREIGN PATENT DOCUMENTS

DE          198 50 549 A1    5/2000
DE     10 2005 035 328 A1    3/2007
(Continued)

OTHER PUBLICATIONS

German language Search Report dated Feb. 19, 2014 for corresponding German Patent Application No. 10 2013 211 591.1, with English translation.

*Primary Examiner* — William Kelleher
*Assistant Examiner* — Gregory Prather
(74) *Attorney, Agent, or Firm* — Brinks Gilson & Lione

(57) ABSTRACT

An assembly includes a transmission and an electric machine for a hybrid drive of a motor vehicle, and the transmission is a multi-stage standard transmission with first and second subtransmissions, each of which has a separate input shaft and shares an output shaft. Both input shafts are coupled to the shared output shaft via form locking shift elements of the subtransmissions. The assembly includes a first shiftable clutch which is allocated to a first input shaft such that the internal combustion engine is coupled to the first input shaft via the first shiftable clutch, and a second shiftable clutch which is allocated to the second input shaft such that the electric machine is coupled to the second input shaft via the second shiftable clutch. The electric machine is coupled to the internal combustion engine via a third shiftable clutch, and to the first input shaft via a fourth shiftable clutch.

20 Claims, 5 Drawing Sheets

(51) Int. Cl.
    *B60K 6/547*     (2007.10)
    *B60K 6/48*     (2007.10)
    *F16H 3/00*     (2006.01)
    *F16H 3/093*     (2006.01)

(52) U.S. Cl.
    CPC ........ *F16H 3/006* (2013.01); *B60Y 2400/421* (2013.01); *F16H 2003/007* (2013.01); *F16H 2003/0931* (2013.01); *F16H 2200/0056* (2013.01); *Y02T 10/6221* (2013.01); *Y10S 903/902* (2013.01); *Y10T 74/19014* (2015.01)

(56) References Cited

U.S. PATENT DOCUMENTS

| | | | |
|---|---|---|---|
| 8,771,135 B2* | 7/2014 | Tanba | B60W 10/06 |
| | | | 477/5 |
| 8,979,704 B2* | 3/2015 | Kaltenbach | B60K 6/387 |
| | | | 180/65.7 |
| 9,222,563 B2* | 12/2015 | Kaltenbach | B60K 6/387 |
| 9,327,713 B2* | 5/2016 | Kaltenbach | B60K 6/387 |
| 2002/0189397 A1* | 12/2002 | Sakamoto | B60W 30/1819 |
| | | | 74/661 |
| 2006/0130601 A1* | 6/2006 | Hughes | B60K 6/36 |
| | | | 74/340 |
| 2010/0234169 A1* | 9/2010 | Miyazaki | B60K 6/38 |
| | | | 477/3 |

FOREIGN PATENT DOCUMENTS

| | | |
|---|---|---|
| DE | 10 2007 022 774 A1 | 11/2008 |
| DE | 10 2007 051 991 A1 | 5/2009 |
| DE | 10 2009 002 354 A1 | 10/2010 |
| DE | 10 2011 089 463 A1 | 6/2013 |

* cited by examiner

DEVICE INCLUDING A GEAR UNIT AND AN ELECTRIC MACHINE FOR A HYBRID DRIVE AND HYBRID DRIVE

PRIORITY STATEMENT

This application claims the benefit of German Patent Application DE 10 2013 211 591.1, filed Jun. 20, 2013, and incorporates the German Patent Application by reference herein in its entirety.

FIELD

The present disclosure relates to an assembly comprising a transmission and an electric machine for a hybrid drive of a motor vehicle. Furthermore, the present disclosure relates to a hybrid drive for a motor vehicle.

BACKGROUND

The statements in this section merely provide background information related to the present disclosure and may not constitute prior art.

A motor vehicle with a hybrid drive is known from DE 198 50 549 A1, wherein the hybrid drive comprises an internal combustion engine, one or more electric machines, and a transmission designed as a double-clutch transmission. The transmission of the hybrid drive in DE 198 50 549 A1 has two subtransmissions, each of which has a separate input shaft and a shared output shaft. The subtransmissions have form locking shift elements, by means of which both input shafts can be selectively coupled to the shared output shaft. According to this related art, a friction locking, shiftable clutch is allocated to each input shaft, in order to couple the internal combustion engine to the respective input shaft of the respective subtransmission.

Another motor vehicle having a hybrid drive is known from DE 10 2005 035 328 A1, wherein the hybrid drive comprises an internal combustion engine, numerous electric machines, and a transmission designed as a double-clutch transmission. According to this related art as well, a friction locking, shiftable clutch is allocated to each of the two input shafts of the double-clutch transmission.

According to DE 198 50 549 A1 and DE 10 2005 035 328 A1, the two subtransmissions of the respective transmission, designed as a double-clutch transmission, are disengaged in all gear stages. In contrast to this, a transmission designed as a double-clutch transmission is known from DE 10 2009 002 354 A1, the subtransmissions of which can be coupled by means of providing at least one winding gear path via a shift element designed as a winding shift element.

With the hybrid drives, or assemblies, respectively, known from the related art, comprising a transmission and an electric machine for a hybrid drive, input drive functions can already be implemented to a certain extent.

There is, however, a desire to improve an assembly comprising a transmission and an electric machine for a hybrid drive, as well as a hybrid drive having such an assembly, such that with only one single electric machine, the number and type of the functions that can be provided can be increased, such that a comfortable and dynamic driving operation and a good efficiency can be implemented. In particular, if an electrical energy storage unit working in conjunction with the electric machine should become discharged, a good degree of functionality should also then be provided.

SUMMARY

The present disclosure provides an assembly comprising a transmission and an electric machine for a hybrid drive of a motor vehicle, wherein the transmission is designed as a multi-stage standard transmission with two subtransmissions, each of which has a separate input shaft and a shared output shaft, wherein both input shafts can be coupled to the shared output shaft via form locking shift elements of the subtransmissions, wherein a first shiftable clutch is allocated to a first input shaft of a first subtransmission such that the internal combustion engine can be coupled to the first input shaft of the first subtransmission via the first shiftable clutch, and wherein a second shiftable clutch is allocated to a second input shaft of a second subtransmission such that the electric machine can be coupled to the second input shaft of the second subtransmission via the second shiftable clutch.

According to the present disclosure, the electric machine can be connected to the internal combustion engine by means of a third shiftable clutch, and to the first input shaft of the first subtransmission by means of a fourth shiftable clutch.

The assembly according to the present disclosure, comprising a transmission and an electric machine for a hybrid drive, makes it possible, with only one single electric machine, to increase the number and type of functions that can be provided in a hybrid vehicle, such that a comfortable and dynamic driving operation, and a good efficiency can be implemented, this being also the case when an electrical energy storage unit that functions in conjunction with the electric machine, has become discharged.

Another advantage of the assembly according to the present disclosure, comprising a transmission and an electric machine for a hybrid drive, consists of the fact that the present disclosure can be used with a transmission, the two subtransmissions of which are disengaged in all gear stages, as well as with a transmission, the subtransmissions of which can be coupled by providing at least one winding gear path via a shift element designed as a winding shift element.

In one form, the first shiftable clutch, by means of which the internal combustion engine can be coupled to the first input shaft of the first subtransmission, is designed as a friction locking clutch, while, in contrast, the third shiftable clutch, by means of which the electric machine can be coupled to the internal combustion engine, is designed as a form locking clutch. This design for the first clutch and the third clutch is advantageous for increasing the number of input drive side functions that can be provided, with the lowest possible drag losses and lowest possible assembly space requirements.

According to a form of the present disclosure, the second shiftable clutch, by means of which the electric machine can be coupled to the second input shaft of the second subtransmission, is designed as a friction locking clutch, while, in contrast, the fourth shiftable clutch, by means of which the electric machine can be coupled to the first input shaft of the first subtransmission, is designed as a form locking clutch, wherein the third clutch and the fourth clutch are preferably designed as double-shift elements.

With this first form of the present disclosure, using two form locking clutches and two friction locking clutches, the number of input drive side functions that can be provided, with the lowest possible drag losses and lowest possible assembly space requirements, is improved.

According to a second form of the present disclosure, the second shiftable clutch, by means of which the electric machine can be coupled to the second input shaft of the second subtransmission, and the fourth shiftable clutch, by means of which the electric machine can be coupled to the first input shaft of the first subtransmission, are each designed as friction locking clutches.

With this second form of the present disclosure, using one form locking clutch and the three friction locking clutches, the number of input drive side functions that can be provided is likewise reduced, but, in comparison with the first further development of the present disclosure, however, there is an increase in drag losses and assembly space requirements.

According to a third form of the present disclosure, the second shiftable clutch, by means of which the electric machine can be coupled to the second input shaft of the second subtransmission, and the fourth shiftable clutch, by means of which the electric machine can be coupled to the first input shaft of the first subtransmission, are each designed as form locking clutches, wherein the third clutch and the fourth clutch are designed as double-shift elements.

With this third form of the present disclosure, using one friction locking clutch and three form locking clutches, drag losses and assembly space requirements can be further reduced, but the number of the input drive side functions that can be provided is, however, decreased in comparison with the first and second forms.

In another form, the first subtransmission and the second subtransmission of the transmission can be coupled, when at least one winding gear path has been provided via a winding shift element, wherein the first subtransmission and the second subtransmission are coupled, in particular, via the winding shift element, in the first forward gear. Through the use of subtransmission that can be coupled in at least one winding gear path, the number of input drive side functions that can be provided can be further increased.

A hybrid drive for a motor vehicle comprises an internal combustion engine and the device according to the present disclosure.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

In order that the disclosure may be well understood, there will now be described various forms thereof, given by way of example, reference being made to the accompanying drawings, in which.

Figure 1:
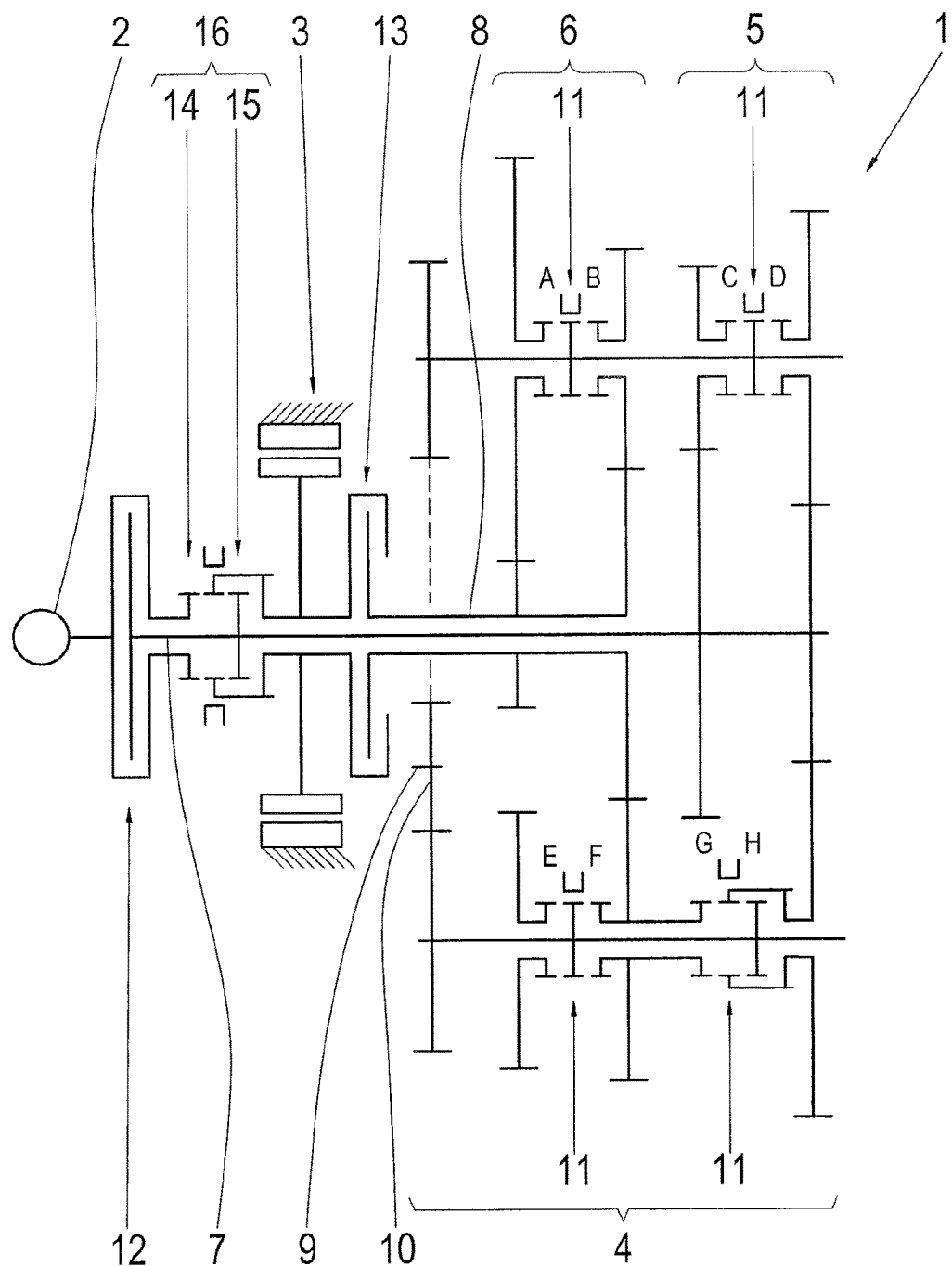
FIG. 1 is a layout for a first hybrid drive, according to the present disclosure, for a motor vehicle, or a first assembly according to the present disclosure, respectively, comprising a transmission and an electric machine for a hybrid drive, together with an internal combustion engine.

The drawings described herein are for illustration purposes only and are not intended to limit the scope of the present disclosure in any way.

DETAILED DESCRIPTION OF EXAMPLE EMBODIMENTS

The following description is merely exemplary in nature and is not intended to limit the present disclosure, application, or uses. It should be understood that throughout the drawings, corresponding reference numerals indicate like or corresponding parts and features.

FIGS. 1-5 show embodiments for a hybrid drive 1 according to the present disclosure, for a motor vehicle, or an assembly according to the present disclosure, respectively, for a hybrid drive 1, wherein the assemblies comprise at least one transmission 4 and one electric machine 3, and wherein the respective hybrid drive 1, in addition to the respective assembly comprising a transmission 4 and the electric machine 3, also has an internal combustion engine 2.

The transmission 4 is designed as a multi-step shifting transmission having two subtransmissions 5, 6, wherein the two subtransmissions 5, 6 each have a separate input shaft 7, 8, and a shared output shaft 9. The output shaft 9 is coupled to the subtransmissions 5 and 6 via a differential gear 10. The transmission 4 has, according to FIG. 1, numerous form locking shift elements A, B, C, D, E, F, G, and H, combined to form shifting packets 11, by means of which each of the two input shafts 7 and 8 can be coupled to the output shaft 9.

The transmission 4 shown in FIGS. 1-5, having the two subtransmissions 5 and 6, concerns a double-clutch transmission, in which the first subtransmission 5 and the second subtransmission 6 can be coupled, through providing at least one winding gear path via a winding shift element.

As such, at total of seven forward gears and two reverse gears can be provided with the transmission 4 shown in FIGS. 1-5, wherein the first forward gear and the first reverse gear each concern a so-called winding gear path, in which the two subtransmission 5 and 6 are coupled by means of the shift element G.

The functionality and the construction of a transmission 4 of this type, having winding gear paths, is known from DE 10 2009 002 354 A1 and U.S. Pat. No. 8,393,239, and thus requires no detailed explanation.

Although the present disclosure can be used, particularly, in combination with a transmission 4 of this type, the present disclosure can also be used with a transmission 4 having two subtransmissions 5, 6, which can be disengaged in all gear stages.

The transmission 5 shown in FIGS. 1-4, having the two subtransmissions 5 and 6, is merely one form of the present disclosure.

In the shown embodiment of the present disclosure, the two input shafts 7 and 8 of the two subtransmissions 5 and 6 are disposed such that they are coaxial to one another. For this, the second input shaft 8 is designed as a hollow shaft, which partially encompasses, concentrically, the first input shaft 7. In differing therefrom, it is also possible, however, that the electric machine is not connected coaxially, but rather axially offset, for example, having at least one spur gear step.

At this point, it should also be noted that the illustrated distribution of the gear steps to the subtransmissions 5 and 6, as well as the gear sets used in the transmission, are of a purely exemplary nature. In differing from the illustrated embodiment examples, the transmission can also exhibit planetary gear sets or planetary gear sets in combination with spur gear sets.

Furthermore, it should be noted at this point that the internal combustion engine 2 and the electric machine 3 can also be positioned on different, opposing sides of the transmission 4, wherein the transmission 4 is then positioned between the electric machine 3 and the internal combustion engine 2. For this, however, one of the transmission input shafts may be on the other side of the transmission 4.

A first shiftable clutch 12 is allocated to the first input shaft 7 of the first subtransmission 5 of the transmission 4, specifically, in such a manner that the electric machine 3 can be coupled to the second input shaft 8 of the second subtransmission 6 via the second shiftable clutch 13. In the embodiment examples of FIGS. 1 and 2, this second shiftable clutch 13 is likewise a friction locking clutch.

In addition to the first shiftable clutch 12 and the second shiftable clutch 13, two further shiftable clutches are provided according to the present disclosure, wherein the electric machine 3 can be coupled to the internal combustion engine 2 via a third shiftable clutch 14, and to the first input shaft 7 of the first subtransmission 5 via a fourth shiftable clutch 15.

Figure 2:
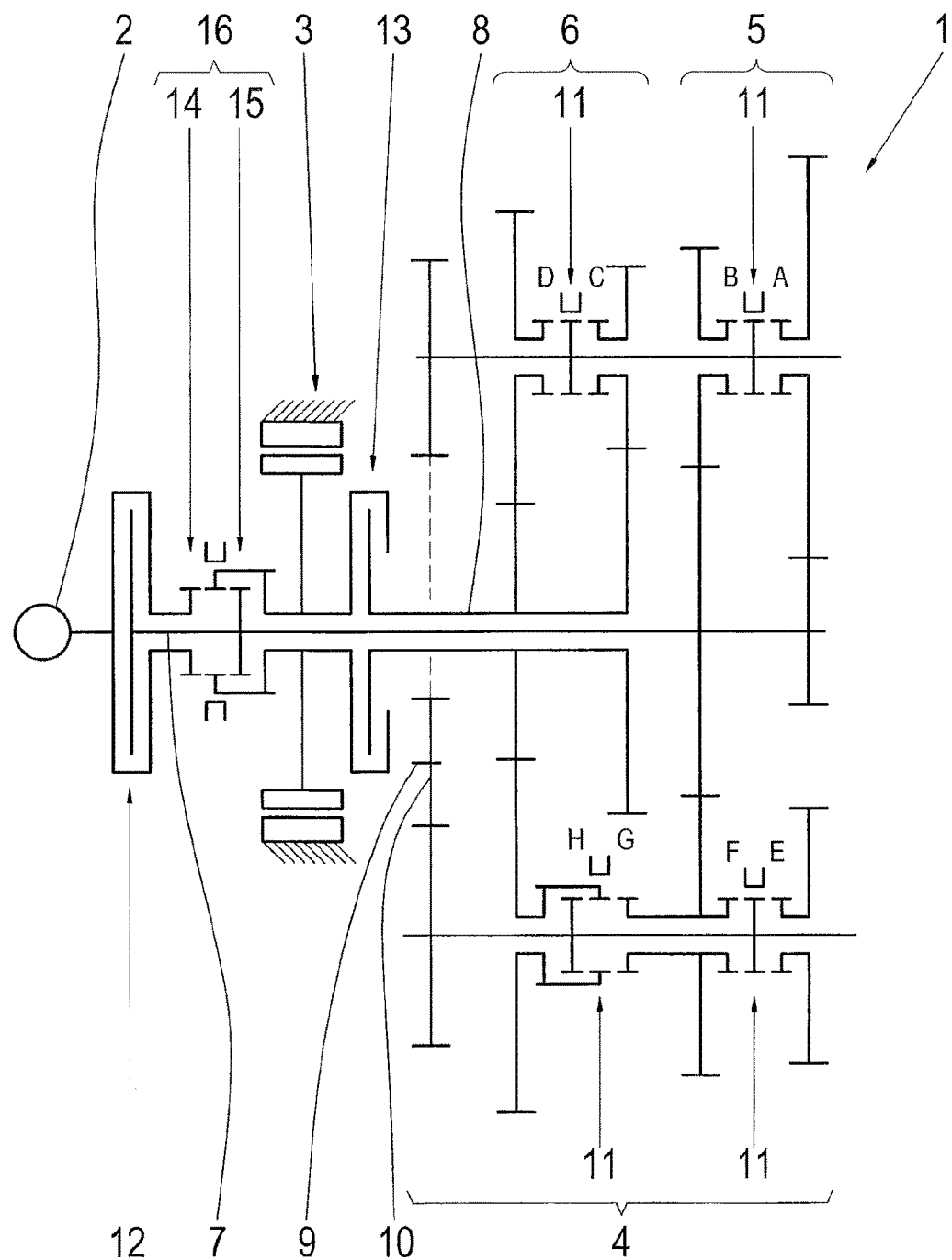
FIG. 2 is a layout for a second hybrid drive, according to the present disclosure, for a motor vehicle, or a second assembly according to the present disclosure, respectively, comprising a transmission and an electric machine for a hybrid drive, together with an internal combustion engine.

In the embodiment examples in FIGS. 1 and 2, the third shiftable clutch 14 and the fourth shiftable clutch 15 are each designed as form locking clutches, such that, accordingly, the assembly according to the present disclosure has two form locking clutches 14 and 15, and two friction locking clutches 12 and 13.

The assembly 1 for the hybrid drive 1 thus has a transmission 4 having two subtransmissions 5 and 6, an electric machine 3, and four shiftable clutches 12, 13, 14, and 15, by means of which the electric machine 3 and the internal combustion engine 2 can be coupled to the two input shafts 7 and 8 of the two subtransmissions 5 and 6 of the transmission 4, as well as to one another.

With the examples of the FIGS. 1 and 2, two shiftable clutches, specifically the first shiftable clutch 12 and the second shiftable clutch 13, are each designed as friction locking clutches, and the two other shiftable clutches, specifically the third shiftable clutch 14 and the fourth shiftable clutch 15, are each designed as form locking clutches, wherein, according to FIGS. 1 and 2, the two form locking clutches, i.e. the third clutch 14 and the fourth clutch 15, are designed as double-shift elements. A double-shift element of this type has three shifting settings, and can be actuated by means of a single actuator.

The two embodiment examples in FIGS. 1 and 2 differ in that in the embodiment in FIG. 1, the first forward gear is provided by the first subtransmission 5, and the second forward gear is provided by the second subtransmission 6 of the transmission 4, while, in contrast, in the embodiment in FIG. 2, the first subtransmission 5 provides the second forward gear, and the second subtransmission 6 provides the first forward gear. For this, the gear sets in the subtransmissions 5, 6 of the transmission 4 are mirror-reversed.

With the variations in FIGS. 1 and 2, the number of input drive side functions that can be provided, as shall be explained in greater detail below, is improved, while the drag losses in the transmission, as well as the necessary assembly space requirements for the transmission, are reduced. The variations in FIGS. 1 and 2 are therefore particularly preferred.

Figure 4:
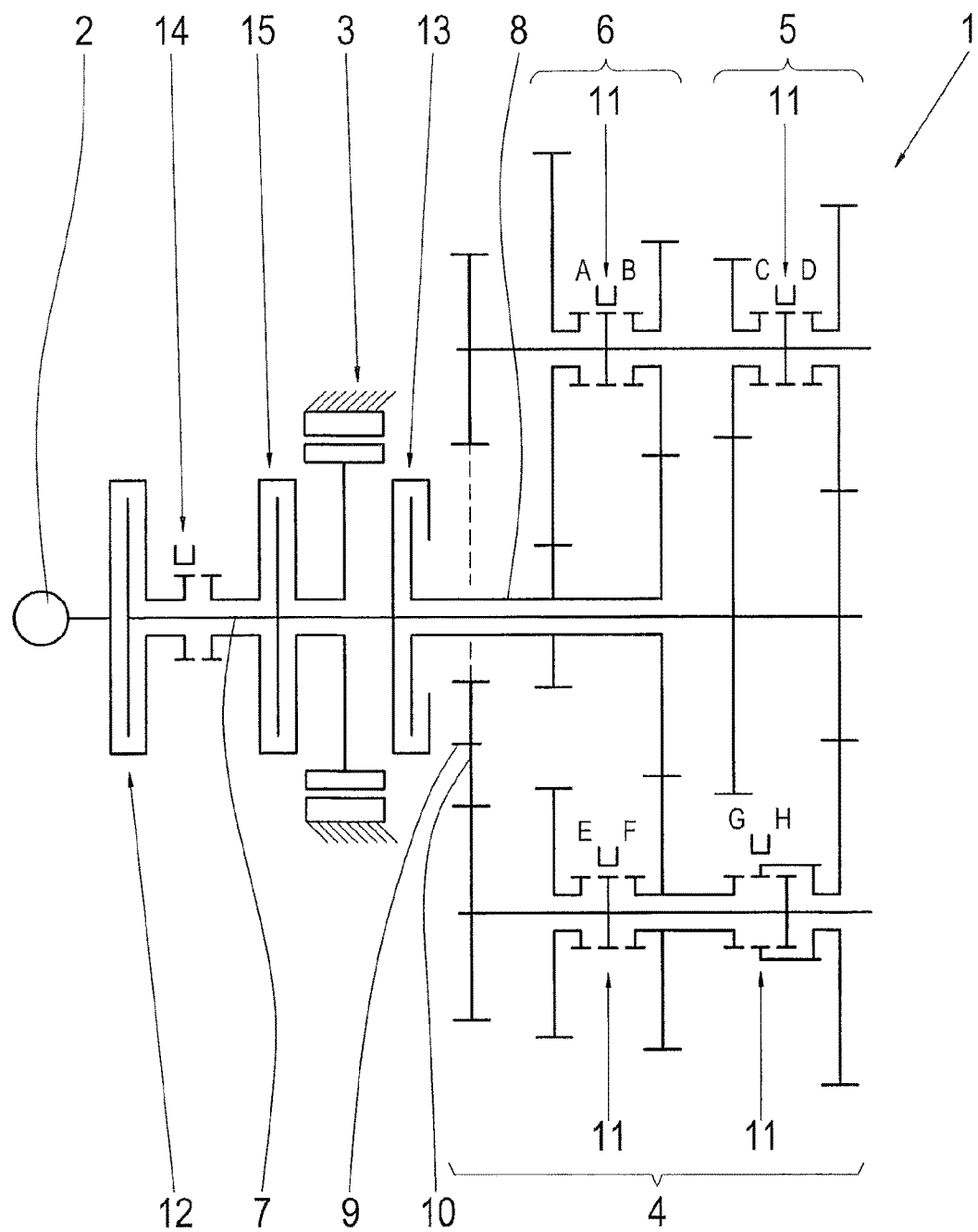
FIG. 4 is a layout for a fourth hybrid drive, according to the present disclosure, for a motor vehicle, or a fourth assembly according to the present disclosure, respectively, comprising a transmission and an electric machine for a hybrid drive, together with an internal combustion engine.
Figure 5:
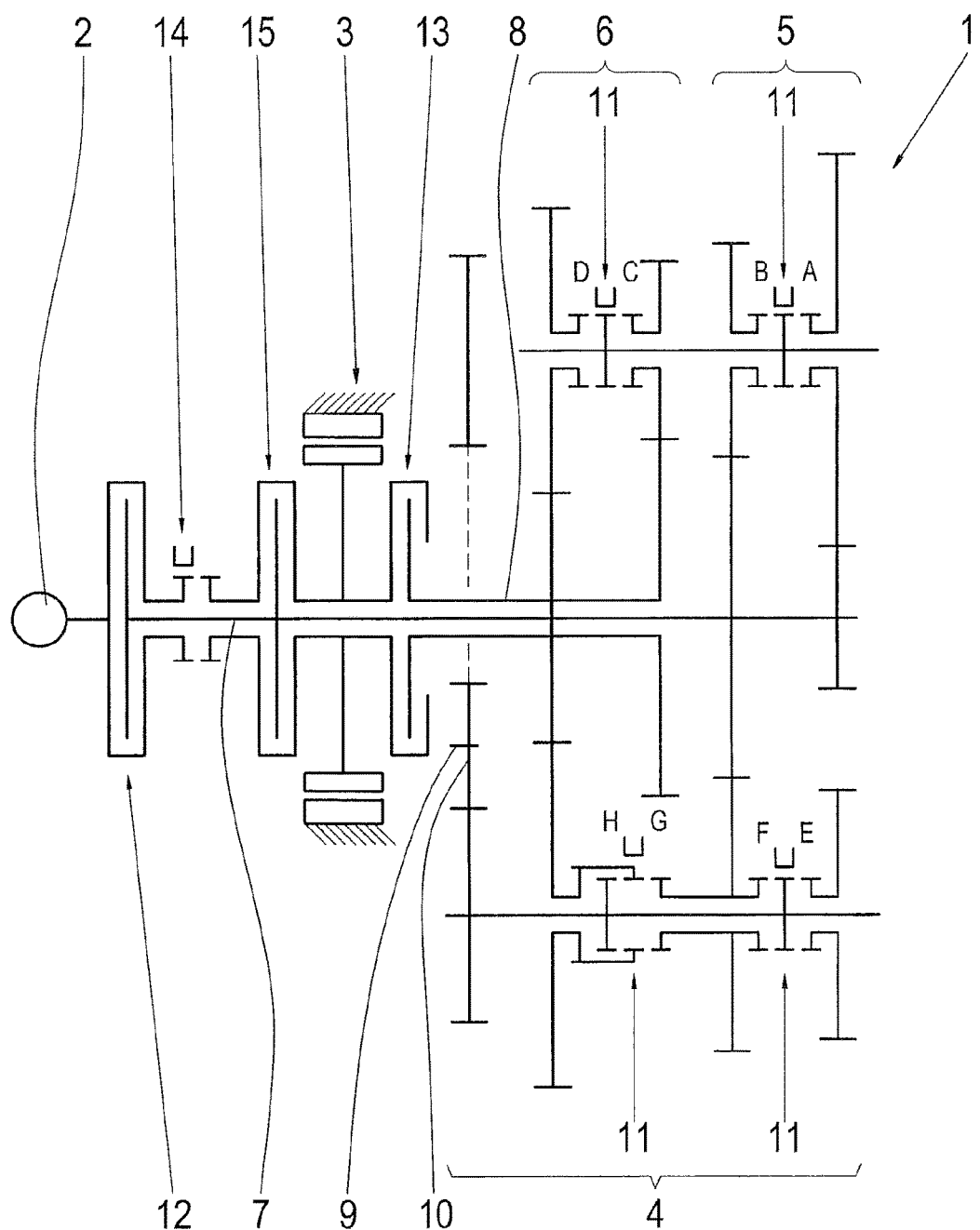
FIG. 5 is a layout for a fifth hybrid drive, according to the present disclosure, for a motor vehicle, or a fifth assembly according to the present disclosure, respectively, comprising a transmission and an electric machine for a hybrid drive, together with an internal combustion engine.

FIGS. 4 and 5 show two embodiments of the present disclosure, with which, likewise, the number of input drive side functions that can be provided can be improved, in which, in differing from the embodiment examples in FIGS. 1 and 2, three friction locking shiftable clutches, and only one form locking shiftable clutch, are used.

Thus, in accordance with the variants in FIGS. 1, 2, 4 and 5, the first shiftable clutch 12 and the second shiftable clutch 13 are each designed as friction locking clutches and the third shiftable clutch 14 is designed, respectively, as a form locking clutch, but in differing from the embodiment examples in FIGS. 1 and 2, however, the fourth shiftable clutch 15, by means of which the electric machine can be coupled to the first input shaft 7 of the first subtransmission 5 of the transmission 4, is designed as another friction locking clutch.

Because, accordingly, in the embodiment examples in FIGS. 4 and 5, three friction locking clutches 12, 13, 15, and only one form locking clutch 14, serve for connecting the internal combustion engine 2 and the electric machine 3 to the input shafts 7, 8 of the two subtransmissions 5, 6 of the transmission, as well as the coupling of the internal combustion engine 2 and the electric machine 3, the embodiments in FIGS. 4 and 5 exhibit increased drag losses and increased assembly space requirements in comparison with the embodiment examples in FIGS. 1 and 2.

The embodiments in FIGS. 4 and 5 differ, as with the embodiments in FIGS. 1 and 2, only in that the gear sets for the subtransmissions 5 and 6 are mirror reversed, such that, accordingly, in the embodiment in FIG. 4, the first subtransmission 5 provides the first forward gear, and the second subtransmission 6 provides the second forward gear, while, in contrast, in the variant in FIG. 5, the first subtransmission 5 provides the second forward gear and the second subtransmission 6 provides the first forward gear.

Figure 3:
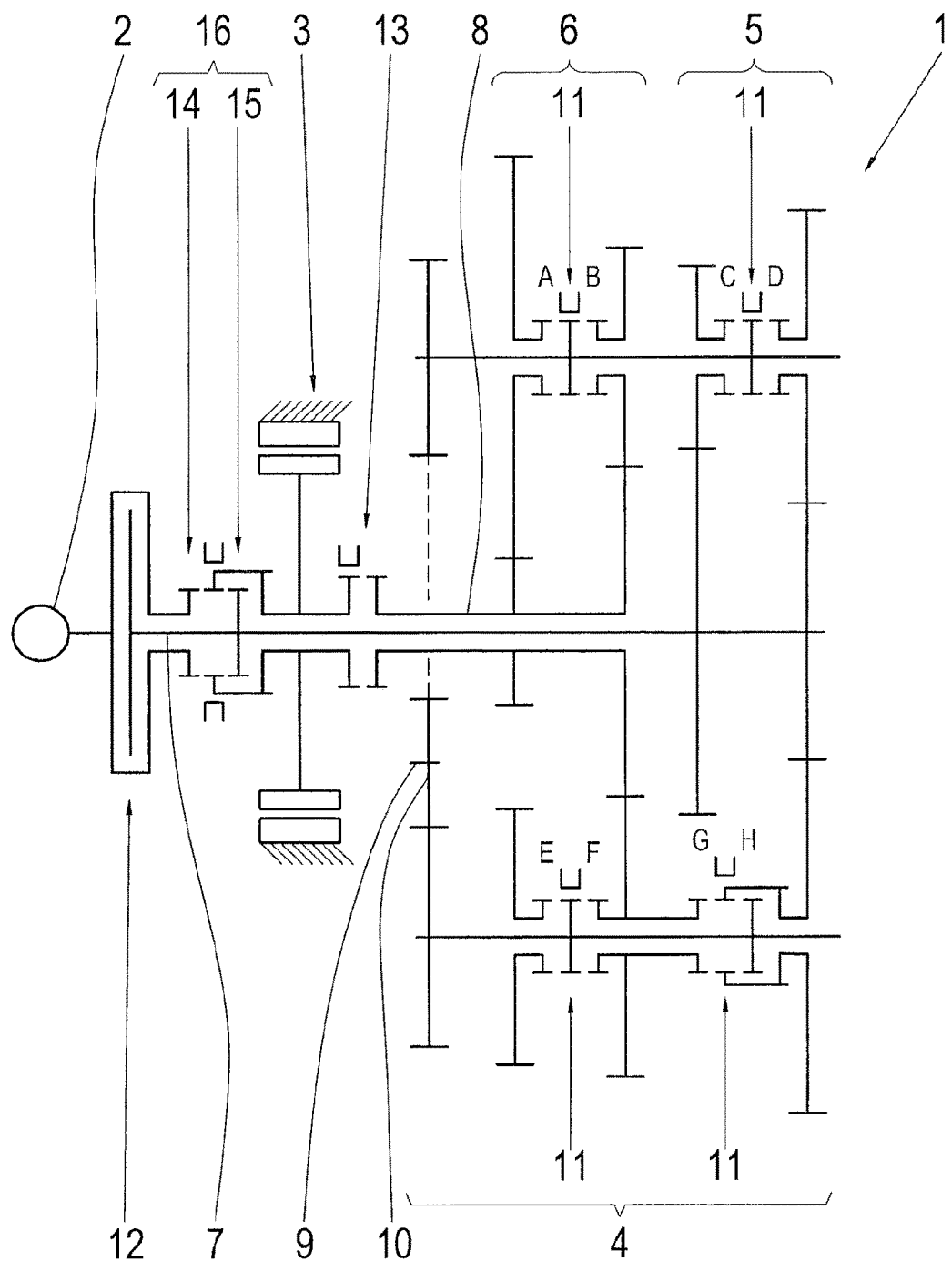
FIG. 3 is a layout for a third hybrid drive, according to the present disclosure, for a motor vehicle, or a third assembly according to the present disclosure, respectively, comprising a transmission and an electric machine for a hybrid drive, together with an internal combustion engine.

Another form of the present disclosure is shown in FIG. 3, wherein, the first shiftable clutch 12, by means of which the internal combustion engine 2 can be coupled to the first input shaft 7 of the first subtransmission 5, is designed as a friction locking clutch, while in FIG. 3, the second clutch 13, by means of which the electric machine 3 can be coupled to the second input shaft 8 of the second subtransmission 6, and likewise, the third shiftable clutch 14, by means of which the electric machine 3 can be coupled to the internal combustion engine 2, and the fourth shiftable clutch 15, by means of which the electric machine 3 can be coupled to the first input shaft 7 of the first subtransmission 5, are each designed as form locking clutches.

Thus, in the embodiment in FIG. 3, three form locking clutches 13, 14, 15 and one friction clutch 12 are used for coupling the internal combustion engine 2 and the electric machine 3 to the input shafts 7, 8 of the subtransmission 5, 6 of the transmission 4, as well as for coupling the internal combustion engine 2 and the electric machine 3 to one another. The third shiftable clutch 14 and the fourth shiftable clutch 15 are again designed as double-shift elements 16 having three shift settings, thereby, which can be actuated by means of an actuator.

All of the embodiments according to the present disclosure shown in FIGS. 1-5 have in common that a transmission 4, having two subtransmissions 5 and 6, is used, wherein the two subtransmissions 5 and 6 have separate input shafts 7 and 8, and a shared output shaft 9. The internal combustion engine 2 can be coupled to the first input shaft 7 of the first subtransmission 5 via a first shiftable clutch 12, which is designed, in each case, as a friction locking clutch, wherein an input drive side clutch half of this clutch 12 is connected to the internal combustion engine 2, and an output drive side clutch half of this clutch 12 is connected to the first transmission input shaft 7 of the first subtransmission 5. A vibration absorber can be incorporated between the input drive side clutch half of the first clutch 12 and the internal combustion engine 2.

A third shiftable clutch 14 serves for the coupling of the electric machine 3 directly to the internal combustion engine 2, wherein this third shiftable clutch 14 is designed as a form locking clutch in all of the embodiments. Furthermore, in all of the embodiments there is the second shiftable clutch 13, which serves for the connecting of the electric machine 3 to the second input shaft 8 of the second subtransmission 6, and the fourth shiftable clutch 15, which serves for the connecting of the electric machine 3 to the first input shaft 7 of the first subtransmission 5, wherein the second shiftable clutch 13 and the fourth shiftable clutch 15 are designed either as a form locking clutch or a friction locking clutch, depending on the embodiment.

An input drive side clutch half of the second shiftable clutch 13 is always connected to the electric machine 3, and an output drive side clutch half of the second shiftable clutch 13 is always connected to the second transmission input shaft 8 of the second subtransmission 6. The input drive side clutch half of the first shiftable clutch 12 can be coupled to the output drive side clutch half of the second shiftable clutch 13 via the third shiftable clutch 14. The input drive side clutch half of the second shiftable clutch 13 can be connected to the output drive side clutch half of the first shiftable clutch 12 via the fourth shiftable clutch 15.

In the following, the functionalities compiled in the following table, which can be, entirely or partially, provided in the respective forms of the present disclosure, are listed. An X indicates that the respective function can be provided.

| | Variation FIG. 1 | Variation FIG. 2 | Variation FIG. 3 | Variation FIG. 4 | Variation FIG. 5 |
|---|---|---|---|---|---|
| EM as power shifting element | X | X | X | X | X |
| Electric mode without drag loss | X | X | X | — | — |
| Start-up from charging mode in first gear | X | X | X | X | X |
| Tow start | X | X | X | X | X |
| Tow start with transmission ratio for internal combustion engine | X | X | X | X | X |
| Drive start | X | X | — | X | X |
| Electric power shifting variation 1 | X | X | — | X | X |
| Electric power shifting variation 2 | — | — | — | X | X |
| Stalling safeguard when parking brake is engaged | X | X | X | X | X |
| Internal combustion engine start-up | X | X | X | X | X |
| Internal combustion engine emergency mode without rotating electric machine | X | X | X | X | X |
| Electric operation via slipping clutch | X | X | — | X | X |
| Internal combustion engine power shifting | X | X | — | X | X |
| Gear stage selection independently of internal combustion engine and electric machine | X | X | X | X | X |

With the function "EM as power shift element," a power shifting with alternating support of the output drive torque can be carried out in the hybrid drive, i.e. when powered by the internal combustion engine 2 and the electric machine (EM) 3. When a shifting occurs in the first subtransmission 5, the electric machine 3 can support the output drive torque via the second subtransmission 6. Then, when a shifting occurs in the second subtransmission 6, the internal combustion engine 2 can support the output drive torque via the first subtransmission 5. Energy losses are significantly reduced at the friction locking elements due to friction during the execution of these shiftings.

With the function "Electric mode without drag loss," no drag losses should occur at a friction clutch during pure electric driving mode via the electric machine (EM) 3 with the internal combustion engine 2 being shut off. This is possible when, for disengaging the internal combustion engine 2, a form locking clutch is present. The shift elements in the two subtransmissions 5 and 6 are a form locking in the embodiments. The function "electric mode without drag loss" is of particular significance in so-called plug-in-hybrids having a high portion of electric driving.

In the function "start-up from charging mode in first gear," the electric machine 3 must function as a generator when the energy storage unit is empty, in order to provide electrical power for the electrical loads in the hybrid vehicle, such as, for example, for an electrical air conditioning unit. In this case, the internal combustion engine 2 and the electric machine 3 are coupled. If this is necessary when the hybrid vehicle is at a standstill, or close to a standstill, it is possible to initiate a start-up without delays. For this, a friction locking clutch is required in the connection of the internal combustion engine 2 and the electric machine 3 with one of the subtransmissions 5, 6 of the transmission, by means of which a start-up torque can then be applied without delays.

With the function "start-up from charging mode in first gear," the electric machine 3 is coupled to the internal combustion engine 2 via the third clutch 14 in the variations shown in FIGS. 1, 3 and 4, wherein the first gear is engaged in the first subtransmission 5, and thus, in the second subtransmission 6, as a result of the first gear being a winding gear path, the second gear is engaged. As a result, the electric machine 3 is decoupled from the second subtransmission 6 by a disengaged second clutch 13, wherein the start-up via the first clutch 12 takes place. In the variations in FIGS. 2, 5, the first gear is engaged in the second subtransmission 6, and thus the second gear is engaged in the first subtransmission 5 thereby.

With the function "tow start," the internal combustion engine 2 is tow-started via a friction locking clutch during electric driving mode. This tow-start torque can be compensated for via the electric machine 3, such that the tow start has no noticeable effect on the output drive.

With the function "Tow start with transmission ratio for internal combustion engine," the internal combustion engine (VM) 2 has a higher transmission ratio for the output drive than the electric machine 3. This can be achieved in that the electric machine 3 and the internal combustion engine 2 are not connected to the same subtransmission during the tow-starting of the internal combustion engine 2, but rather, use different subtransmissions. With the subtransmission used by the internal combustion engine, a higher gear, or a smaller transmission ratio, respectively, is engaged than in the subtransmission used by the electric machine 3. This has the advantage that a lower rotational speed difference is present at the clutch with which the internal combustion engine 2 is started. As a result, the power loss at this clutch can be reduced. The electric machine 3 then has less torque to compensate for, because the electric machine 3 has a higher transmission ratio at the output drive.

The function "drive start" functions in fundamentally the same manner as the function "tow start," but, however, with an additional torque decoupling from the output drive 9. The torque decoupling from the output drive is obtained with a friction locking clutch operated with slippage. The rotational speed difference at this friction clutch is regulated by the electric machine 3. For the function "drive start," a friction clutch between the electric machine 3 and the internal combustion engine 2, as well as a friction clutch between the electric machine 3 and the first subtransmission 5, are used.

In the functions "electric power shifting variation 1" and "electric power shifting variation 2," power shiftings are possible during purely electric driving, and, accordingly, when the internal combustion engine 2 is shut off, via friction locking clutches. As a result, gear stages of the transmission 4 can also be engaged during purely electrical driving, without interruptions to the tractive force.

In the function "electric power shifting variation 1," only one gear change as a power shifting is possible if, for the electric machine, only one power shift clutch is available. In the function "electric power shifting variation 2," all gears can be power shifted, specifically if two power shifting clutches are available for the electric machine.

The function "electric power shifting variation 2" can be used in the variations in FIGS. 4 and 5, wherein the first clutch 12 and the third clutch 14 are disengaged in the variation in FIG. 4, and the second clutch 13 and the fourth clutch 15 function as double-clutches for the electric machine 3, wherein all gear stages are fully power shiftable in the purely electric driving mode. In the variation in FIG. 5, the second clutch 13 and the third clutch 14 are disengaged for this, wherein the first clutch 12 and the fourth clutch 15 function as double-clutches for the electric machine 3, wherein all of the gear stages are then fully power shiftable in the purely electric driving mode.

The function "stalling safeguard when parking brake is engaged" can only be implemented when a friction locking clutch is provided in the power flow from the internal combustion engine 2 to the output drive, because a friction locking clutch can also be disengaged when under load. A form locking clutch cannot be disengaged in this case, without further measures, and the internal combustion engine 2 could stall.

With the function "internal combustion engine start-up," an internal combustion engine start-up via a friction locking clutch, without support via the electric machine 3, is possible. With a power-oriented drive, the start-up torque of the internal combustion engine (VM) 2 and the electric machine 3 can then be added together, or cumulative. For this, a friction locking clutch in the power flow from the internal combustion engine 2 to one of the two subtransmissions 5 or 6 is necessary. This function is also useful as an emergency mode, for example, when a power electronic of the electric machine fails.

The function "internal combustion engine emergency mode without rotating electric machine" enables a start-up using only the internal combustion engine. This function is of particular advantage if the electric machine 3 has permanent magnets in its rotor, because otherwise a voltage would be induced when the rotor is rotating.

The function "electric driving via clutch slippage" is advantageous for preventing so-called derating when the electric machine 3 is at a standstill, or with very low rotational speeds of the electric machine 3. Then, if the rotational speed of the rotor in the electric machine 3 is too low, for purposes of power, particularly with synchronization machines in the power inverter, the load always has the same phase, such that the torque, due to overheating, must be deregulated after a certain time period. This effect of the derating can be prevented.

Via the function "internal combustion engine power shifting," conventional power shiftings can be depicted in the hybrid drive via the friction clutches. In the variations in FIGS. 1, 2, 4 and 5, the third clutch 14 is permanently engaged for this purpose, wherein the first clutch 12 and the second clutch 13 then function in the manner of a conventional double-clutch for the internal combustion engine 2.

In the function "gear stage selection independently of internal combustion engine and electric machine," different transmission ratios, in part, can be selected in the hybrid drive for the internal combustion engine (VM) 2 and the electric machine (EM) 3, specifically such that both the internal combustion engine 2 and the electric machine 3 can be operated at their optimal duty point.

The form locking, transmission internal, shift elements A, B, C, D, E, F, G, H, and the transmission external clutches 13, 14, 15, in the case of a form locking design thereof, must be synchronized in order to be engaged, wherein a form locking shift element can, for example, be equipped with its own conventional synchronization means by means of synchronization rings. Alternatively, it is possible to provide a central synchronization means, by means of braking a corresponding shaft via a transmission brake, for example, by means of accelerating a corresponding shaft via a motor engagement of the internal combustion engine 2, or via a central synchronization means making use of the electric machine 3. Fundamentally, all of the known synchronization procedures, or synchronization methods, respectively, can be used in the variations in FIGS. 1-5.

In the variation in FIG. 2, it is advantageous if the shift elements C and D and the third clutch 14 are designed as claw clutches, without synchronization means, which are actively synchronized by means of the electric machine 3.

The shift element G is to be designed in FIG. 3 such that it is synchronized, because the first forward gear and the first reverse gear are engaged by means of the shift element G. For this reason, the electric machine 3 cannot synchronize the shift element G during a charging operation, or generator operation, when the third clutch 14 is engaged.

The shift element H is also advantageously to be designed as having a synchronization means, because during purely electrical driving in the second gear, in which the shift element A and the fourth clutch 15 are engaged, in order to shift to the third gear while the first clutch 12 is disengaged, the shift element H must be engaged. Subsequently, a conventional upward power shifting to the third gear can then be executed via the first clutch 12.

All other form locking shift elements are likewise to be advantageously designed having synchronization means, because, with tractive force support by means of the electric machine 3, during the execution of a shifting procedure the electric machine 3 cannot synchronize these shift elements at the same time.

REFERENCE NUMBERS

1 hybrid drive
2 internal combustion engine
3 electric machine
4 transmission
5 first subtransmission
6 second subtransmission
7 first input shaft
8 second input shaft
9 output shaft
10 differential gear
11 shifting packet
12 first shiftable clutch
13 second shiftable clutch
14 third shiftable clutch
15 fourth shiftable clutch
16 double-shift element

What is claimed is:

1. An assembly comprising a transmission and an electric machine for a hybrid drive of a motor vehicle, wherein the transmission is a multi-stage standard transmission comprising:
   a first subtransmission comprising a first input shaft; and
   a second subtransmission comprising a second input shaft, said first and second subtransmissions sharing a shared output shaft;
   wherein the first and second input shafts are coupled to the shared output shaft via form locking shift elements of the first and second subtransmissions;
   wherein a first shiftable clutch is allocated to the first input shaft of the first subtransmission such that an internal combustion engine is coupled to the first input shaft via the first shiftable clutch, and a second shiftable clutch is allocated to the second input shaft of the second subtransmission such that the electric machine is coupled to the second input shaft via the second shiftable clutch;
   wherein the electric machine is coupled to the internal combustion engine via a third shiftable clutch, and to the first input shaft via a fourth shiftable clutch; and
   wherein the electric machine is positioned between the second shiftable clutch and the fourth shiftable clutch, and wherein the first shiftable clutch and the third shiftable clutch are positioned on the same side of the electric machine as the fourth shiftable clutch.

2. The assembly according to claim 1, wherein the first shiftable clutch, by means of which the internal combustion engine is coupled to the first input shaft of the first subtransmission, is a friction locking clutch.

3. The assembly according to claim 1, wherein the third shiftable clutch, by means of which the electric machine is coupled to the internal combustion engine, is a form locking clutch.

4. The assembly according to claim 1, wherein the second shiftable clutch, by means of which the electric machine is coupled to the second input shaft of the second subtransmission, and the fourth shiftable clutch by means of which the electric machine is coupled to the first input shaft of the first subtransmission, are form locking clutches.

5. The assembly according to claim 4, wherein the first subtransmission provides a first forward gear and the second subtransmission provides a second forward gear.

6. The assembly according to claim 4, wherein the third shiftable clutch and the fourth shiftable clutch, each of which is a form locking clutch, form a double-shift element.

7. The assembly according to claim 1, wherein the second shiftable clutch, by means of which the electric motor is coupled to the second input shaft of the second subtransmission, is a friction locking clutch, and the fourth shiftable clutch, by means of which the electric machine is coupled to the first input shaft of the first subtransmission, is a form locking clutch.

8. The assembly according to claim 7, wherein the first subtransmission provides a first forward gear, and the second subtransmission provides a second forward gear.

9. The assembly according to claim 7, wherein the first subtransmission provides a second forward gear, and the second subtransmission provides a first forward gear.

10. The assembly according to claim 1, wherein the second shiftable clutch, by means of which the electric machine is coupled to the second input shaft of the second subtransmission, and the fourth shiftable clutch, by means of which the electric machine is coupled to the first input shaft of the first subtransmission, are friction locking clutches.

11. The assembly according to claim 10, wherein the first subtransmission provides a first forward gear, and the second subtransmission provides a second forward gear.

12. The assembly according to claim 10, wherein the first subtransmission provides a second forward gear, and the second subtransmission provides a first forward gear.

13. The assembly according to claim 1, wherein the first subtransmission and the second subtransmission are coupled when at least one winding gear path is provided.

14. The assembly according to claim 13, wherein the first subtransmission and the second subtransmission are coupled, at least in a first forward gear, via a winding shift element.

15. The assembly according to claim 1, wherein the shared output shaft is coupled to the first and second subtransmissions via a differential gear.

16. The assembly according to claim 1, wherein an input drive side clutch half of the second shiftable clutch is coupled to an output drive side clutch half of the first shiftable clutch via the fourth shiftable clutch.

17. The assembly according to claim 1, wherein the first and second input shafts are coaxially disposed to one another.

18. A hybrid drive for a motor vehicle, having the internal combustion engine and the assembly according to claim 1.

19. An assembly comprising a transmission and an electric machine for a hybrid drive of a motor vehicle, wherein the transmission is a multi-stage standard transmission comprising:
   a first subtransmission comprising a first input shaft; and
   a second subtransmission comprising a second input shaft, said first and second subtransmissions sharing a shared output shaft;
   wherein the first and second input shafts are coupled to the shared output shaft via form locking shift elements of the first and second subtransmissions;
   wherein a first shiftable clutch is allocated to the first input shaft of the first subtransmission such that an internal combustion engine is coupled to the first input shaft via the first shiftable clutch, and a second shiftable clutch is allocated to the second input shaft of the second subtransmission such that the electric machine is coupled to the second input shaft via the second shiftable clutch;

wherein the electric machine is coupled to the internal combustion engine via a third shiftable clutch, and to the first input shaft via a fourth shiftable clutch;

wherein an input drive side clutch half of the second shiftable clutch is always connected to the electric machine, and an output drive side clutch half of the second shiftable clutch is always connected to the second input shaft of the second subtransmission; and wherein an input drive side clutch half of the third shiftable clutch is always connected to the internal combustion engine.

20. An assembly comprising a transmission and an electric machine for a hybrid drive of a motor vehicle, wherein the transmission is a multi-stage standard transmission comprising:

a first subtransmission comprising a first input shaft; and a second subtransmission comprising a second input shaft, said first and second subtransmissions sharing a shared output shaft;

wherein the first and second input shafts are coupled to the shared output shaft via form locking shift elements of the first and second subtransmissions;

wherein a first shiftable clutch is allocated to the first input shaft of the first subtransmission such that an internal combustion engine is coupled to the first input shaft via the first shiftable clutch, and a second shiftable clutch is allocated to the second input shaft of the second subtransmission such that an output drive side clutch half of the first shiftable clutch is coupled to the second input shaft via the second shiftable clutch;

wherein the electric machine is coupled to the internal combustion engine via a third shiftable clutch, and to the first input shaft via a fourth shiftable clutch; and wherein the electric machine is positioned between the second shiftable clutch and the fourth shiftable clutch, and wherein the first shiftable clutch and the third shiftable clutch are positioned on the same side of the electric machine as the fourth shiftable clutch.

* * * * *